United States Patent Office 2,840,570
Patented June 24, 1958

2,840,570

DILACTONES AND THEIR PREPARATION FROM CARBON MONOXIDE AND ACETYLENES

John C. Sauer, Cragmere, Del., assignor to E. I. du Pont de Nemours and Company, Wilmington, Del., a corporation of Delaware No Drawing. Application November 25, 1955
Serial No. 549,155

11 Claims. (Cl. 260—343.6)

This invention relates to new compositions of matter, to methods for their preparation, and to their use as chemical intermediates. More particularly this invention relates to new dilactones, to their preparation, and to their use in preparing hydrogenated products thereof, especially suberic acids.

This application is a continuation-in-part of my copending application Serial No. 432,599, filed May 26, 1954, now abandoned.

Acetylene is known to form acrylates when it is reacted with carbon monoxide and alcohols either in the presence of nickel or cobalt carbonyls or in the presence of salts of bivalent nickel [Copenhaver and Bigelow, "Acetylene and Carbon Monoxide Chemistry," Reinhold Publishing Co., New York (1949), page 247].

It is an object of this invention to provide new compositions of matter and methods for their preparation. A further object is to provide new chemical intermediates and processes for preparing useful hydrogenated products therefrom. A still further object is to provide new dilactones and methods for their preparation. Another object is to provide novel catalytic processes for preparing useful products from acetylenes and carbon monoxide. Still another object is to provide a new method for preparing suberic acids. Other objects will appear hereinafter.

These and other objects of this invention are accomplished by providing new dilactones corresponding to $C_8(RR')_2O_4$, wherein R and R' are hydrogen, haloaryl, alkoxyaryl or hydrocarbon radicals free from non-aromatic unsaturation and methods for their preparation. This invention specifically provides new unsaturated dilactones corresponding to $C_8H_4O_4$, characterized in having specific absorptive coefficients in the neighborhood of 3300 to 3400 A. of 200 to 224, melting from 220° to 250° C., having a hydrogen number, determined with palladium-on-charcoal corresponding to about 3 moles of hydrogen per molecule, and yielding suberic acid on hydrogenation with platinum in acetic acid or other polar solvents. There is also provided a method for preparing suberic acids from acetylenes and carbon monoxide through the dilactones of this invention as intermediates. This invention further provides a method for obtaining hexahydrodilactones by saturation of the carbon:carbon unsaturation of said dilactones.

It has now been found that if an acetylene and carbon monoxide are reacted in an inert organic solvent in contact with a cobalt carbonyl catalyst, there are obtained new dilactones corresponding in composition to $C_8(RR')_2O_4$, in which R and R' have the previously indicated meanings. These dilactones show strong absorption lines in the ultraviolet spectra in the region of 3300 to 4400 A. and in this region have specific absorption coefficients of 75 to 224. They also yield suberic acids on hydrogenation with platinum in acetic acid.

The dilactones of this invention correspond to the formula $C_8(RR')_2O_4$ and exist in isomeric forms. These include a cis and a trans form wherein R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing less than 7 carbon atoms, aryl, especially where the aryl radical is hydrocarbon of not more than 10 carbon atoms, aralkyl, especially of not more than 7 carbons, or cycloalkyl, particularly of not more than 7 carbon atoms. Examples of such radicals are methyl, ethyl, octyl, decyl, dodecyl, phenyl, tolyl, xylyl, benzyl, cyclohexyl, naphthyl, methylcyclohexyl, methoxyphenyl, ethoxyphenyl, decyloxyphenyl, dodecyloxyphenyl, dodecyloxynaphthyl, chlorophenyl, chloronaphthyl, and the like.

The dilactone from acetylene and carbon monoxide corresponds in molecular formula to $C_8H_4O_4$. Two structural isomeric forms have been isolated and identified and correspond to the trans and cis forms of $[\Delta^{2,2'(5H,5'H)}]$-bifuran]-5,5'-dione, as follows:

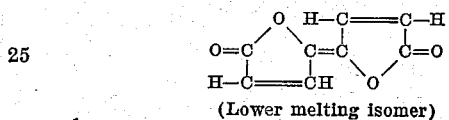

(Lower melting isomer)
Trans form and

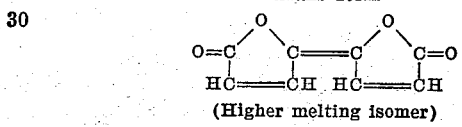

(Higher melting isomer)
Cis form

The lower melting isomer which is the principal product of the reaction, as carried out in Example I, below, has a melting point of 230–237° C. and the higher melting isomer has a melting point of 240–248° C., determined in a capillary tube in an electrically heated melting point apparatus. The isomers can be recrystallized repeatedly from methyl ethyl ketone to give samples melting at 235 and 247° C., respectively, when a setting is used such that the temperature increases from 175 to 200° C. in 6 minutes, from 200 to 225° C. in 9 minutes, and from 225 to 247° C. in 11 minutes. The melting is generally accompanied by sublimation and decomposition.

The two isomers are further distinguished by their ultraviolet absorption: The pure lower melting isomer has its maximum absorption at about 3400 A. and its specific absorbence, $k_{3400\ A.}$ is 200–204. The pure higher melting isomer has its maximum absorption at about 3340 A. and its specific absorbence $k_{3340\ A.}$ is 220–224. Thus the ultraviolet specific absorbence for the $C_8H_4O_4$ compound is from 200 to 224.

On the basis of the infrared spectra, the lower melting isomer is assigned the trans configuration and the higher melting isomer is assigned the cis configuration. The selection of the cis structure for the high melting isomer rests primarily on the infrared absorption peaks at 6.0$\mu$ and 6.5$\mu$ (doublet) in the conjugated unsaturation region. The intense band at 6.0$\mu$ which is virtually absent for the low melting isomer, is due to the bridge double bond. On the trans structure, this double bond is astride a center of symmetry and will not absorb. The cis structure has no center of symmetry and the central double bond will absorb. The doublet at 6.5$\mu$ in the spectra of the high melting form is due to the ethylenic double bond of each ring. The low melting form shows only a single peak at 6.5$\mu$ and this is consistent with a trans structure having a center of symmetry.

The low melting isomer can be isomerized to the high melting or cis form by treating it with sulfuric or phosphoric acid or pyridine. The cis isomer can also be obtained from the trans isomer by recrystallization of the trans isomer from dimethylformamide. It can also be produced directly from carbon monoxide and acetylene by including hydrogen sulfide or a strong acid in the reaction mixture.

When an acetylene, other than acetylene itself, is used, there can be positioned isomers, corresponding to the cis and trans forms of

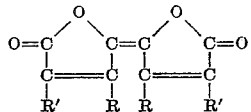

of

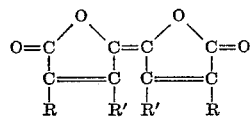

and of

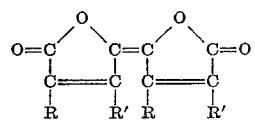

wherein R and R' are defined as aforesaid. These unsaturated dilactones can be represented by the general formulas

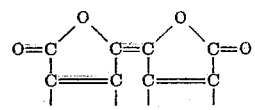

and

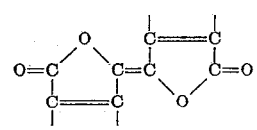

wherein one free valence of each ring is satisfied by R and the other free valences of said rings are satisfied by R', said R and R' being defined as aforesaid.

The new dilactones of this invention are obtained by reacting an acetylene with carbon monoxide in an inert organic solvent in the presence of a cobalt carbonyl catalyst. In one method of operation, a pressure reactor is charged with an inert organic solvent, i. e., one free from active hydrogen, and a catalytic amount of a cobalt carbonyl catalyst, the reactor is closed, cooled to 0° C., or lower, and evacuated. A predetermined amount of acetylene is then admitted from a storage vessel calibrated so that the amount of acetylene delivered is measured by the drop in pressure, and the reactor placed in a shaking device. Carbon monoxide is introduced to between 50 and 3000 atmospheres, usually 250 to 1000 atmospheres, and the charge heated and agitated at 60 to 175° C., usually 85° to 140° C. These conditions are maintained until there is no further reaction, as evidenced by cessation of pressure drop. Throughout the reaction period the pressure within the reactor is maintained within the limits selected for operation by periodic injections of carbon monoxide.

After reaction is complete the reactor is permitted to cool, unreacted acetylene and carbon monoxide are vented to the atmosphere, and the reaction mixture slurried with an inert organic solvent. The slurry is filtered and the residue on the filter extracted with a hot inert organic solvent. The extract is cooled and the crystalline product which separates is filtered and dried.

An alternative method for isolating the desired dilactone is by heating the crude reaction product at 200° C. and 1–2 mm. pressure, and collecting the sublimate on a "cold finger."

The unsaturated dilactones of the aforesaid formula $C_8(RR')_2O_4$ of this invention can be hydrogenated in dioxane with a palladium catalyst to the corresponding hexahydrodilactones. Thus when either the trans or cis isomer of $[\Delta^{2,2'(5H,5'H)}$-bifuran]-5,5'-dione is hydrogenated in solution in an organic solvent over a palladium catalyst, there is obtained the hexahydrodilactone, tetrahydro-[2,2'-bifuran]-5,5'-(2H,2'H)-dione, represented by the structural formula

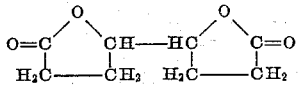

The reduction of the unsaturated dilactone to the hexahydrodilactone is preferably realized with palladium at temperatures of 20 to 150° C. and pressures of 10 to 2000 lb./sq. in. The amount of catalyst used ranges from 1 to 20% by weight of the unsaturated dilactone.

Any palladium catalyst may be used. Thus, there may be used palladium or any of its compounds such as the oxide, chloride, nitrate, etc., and the catalyst may be unsupported or supported on inert base materials. Compounds of palladium appear to be more or less completely reduced to palladium metal during use. Suitable supports are charcoal, alumina, calcium carbonate, pumice, silica, etc. The particle size of the support may vary from 40 to 300 mesh for use in fluidized systems, whereas for use in fixed bed systems supports of larger particle size, e. g. 4 to 40 mesh are satisfactory.

A suitable palladium catalyst is prepared by depositing palladium chloride on granular activated coconut charcoal, in amount sufficient to give a concentration of 0.2 to 20 g. of palladium per liter of catalyst. Preferably the charcoal is subjected to pre-treatment with an acid such as nitric acid prior to contacting it with the palladium compound. A typical preparation is the following.

A solution of 8.33 g. of palladium chloride in 5.5 ml. of concentrated hydrochloric acid and 40 ml. of water is prepared by heating the mixture on a steam bath. The resulting solution is poured into a solution of 135 g. of sodium acetate trihydrate in 500 ml. of water contained in a one-liter reduction bottle. Forty-five grams of activated coconut charcoal is added and the mixture is hydrogenated until hydrogen absorption ceases, which is between 1 and 2 hours. The catalyst is collected on a suction filter and washed with 2 liters of water in five portions. The filter cake, after removal of most of the water, is dried in air and stored in a desiccator over calcium chloride. The catalyst, which weighs from 40 to 50 g. and contains about 10% palladium, is stored, after being powdered, in a tightly closed container.

The examples which follow are submitted to illustrate and not to limit this invention.

EXAMPLE I

*Preparation of the dilactone $C_8H_4O_4$ from acetylene*

A 400-ml. stainless steel shaker tube was flushed with nitrogen and charged with 100 ml. of acetonitrile containing 1 g. of cobalt carbonyl. The tube was closed, cooled in solid carbon dioxide/methanol, and nitrogen was removed by evacuation. By means of a calibrated reservoir, 26 g. of acetylene, previously passed through two towers containing activated alumina and sodium hydroxide, was added to the shaker tube. The shaker tube was placed in an electrically heated box which was shaken vigorously. Carbon monoxide was introduced into the shaker tube, as the tube warmed up, and the actual reaction was carried out at 110° C. during 15 hours at a pressure varying from 700–900 atmospheres. Carbon monoxide was added periodically as required to maintain this pressure. The carbon monoxide absorption was quite brisk, especially during the early stages of the run.

A duplicate run was made and the two runs composited for work up. The reaction mixture was slurried with ether and filtered. The moist precipitate weighed 130.5 g. The precipitate was extracted with hot acetonitrile and this extract upon cooling in ice deposited 13 g. of brick red crystals, melting at 220° C. and analyzing:

*Analysis.*—Calc'd. for $C_8H_4O_4$: C, 58.50%; H, 2,50%; M. W., 164. Found: C, 58.65%, 58.67%; H, 2.47%, 2.62%; M. W., 170, 172; N, trace.

After recrystallization from ethyl acetate, the product analyzed: C, 57.98%, 58.13%; H, 2.68%, 2.66%; N. E. (by titration with sodium ethanolamine in ethylenediamine) 157.99; ultraviolet absorption maximum, λ max., in acetonitrile, 3400 A. The compound showed strong absorption in the infrared at 5.65μ for lactone carbonyl unsaturation and a single very strong band at 6.50μ due to >C=C< unsaturation. These infrared data and the analysis fit the structure of the dilactone [$\Delta^{2,2'(6H,5'H)}$-bifuran]-5,5'-dione.

EXAMPLE II

*Part A.*—Preparation of the dilactone $C_8H_4O_4$ from acetylene

A shaker tube was charged with 100 ml. of acetone containing 2 g. of cobalt carbonyl and 1 g. of pyridine. Twenty-six grams of acetylene was metered into the tube and the reaction was carried out at 110° C. for 15.5 hours at 820-900 atmospheres of carbon monoxide pressure. A duplicate run was made and the two runs composited for work up. The reaction product from both runs was a crumbly, sticky solid. It was extracted with ether and after filtration the moist residue weighed 138.2 g. The filtrate was distilled at room temperature and 25-40 mm. and yielded 0.5 g. of an orange-red crystalline residue which melted at about 214° C.

The ether-insoluble solid reaction product was extracted with warm acetone, yielding 9.5 g. of orange colored crystals. Analytical data on this material was as follows: Found—C, 59.38%, 59.83%; H, 2.69%, 2.82%. The compound was soluble in aqueous alkali. The infrared absorption spectrum of this compound was the same as that of the product of Example I, except for slight intensity variations, indicating that this compound was the same dilactone as the material obtained in Example I.

Analytical data on recrystallized or sublimed samples of this product are given in Table I:

40 minutes. The reaction mixture was separated from the catalyst and the acetic acid removed under vacuum. The solid remaining in the flask was recrystallized from water, M. P. 127-130° C. Infrared analysis indicated almost pure suberic acid with a faint impure band at the lactone position. The hydrogen absorbed in the reaction was beyond that needed for saturation of carbon:carbon double bonds as required for hydrogenolysis of the lactone linkages.

The suberic acid prepared as above was converted to the p-toluidide, melting point 210°-212° C. A recrystallization from acetone did not raise the melting point to the reported 218° C. value of the p-toluidide. However, a mixed melting point with an authentic sample of the p-toluidide of suberic acid showed no depression.

*Part C.*—Hydrogenation of the dilactone $C_8H_4O_4$, to the saturated dilactone, $C_8H_{10}O_4$ Hydrogenation of the dilactone $C_8H_4O_4$, prepared as described above, in dioxane with palladium catalyst at 50° C. resulted in the absorption of 3.38 moles of hydrogen and the product was a viscous oil which distilled mainly at 195-206° C./4 mm. The material upon standing deposited crystals. A sample which was recrystallized from an ether/petroleum ether mixture melted at 99-100° C. This product reacted with 2 moles of alkali indicating a dilactone structure.

*Analysis.*—Calc'd for $C_8H_{10}O_4$: C, 56.40; H, 5.90; sap. No., 662. Found: C, 56.41; H, 6.15; sap. No., 669, 649.

Infrared analysis of the hexahydrodilactone, tetrahydro-[2,2'-bifuran]-5,5'-(2H,2'H)-dione indicated a strong absorption for carbonyl group in a lactone and the absence of hydroxyl groups or carbon:carbon double bonds. Saponification number corresponded closely to the theory for reaction with two moles of alkali and the quantitative hydroxyl number was virtually zero.

1.7 g. sample of the hexahydrodilactone and 0.8 g. of anhydrous hydrazine were warmed on a steam bath. After 15 minutes to one hour the mixture had completely solidified at steam bath temperature. After two hours, the mixture was cooled and recrystallized from water. The resulting dihydrazide analyzed as follows:

*Analysis.*—Calc'd. for $C_8H_{18}O_4N_4$: C, 41.10%; H, 7.70%; N, 23.80%. Found: C, 41.26%; H, 8.02%; N, 23.38%, 23.34%.

The S-benzylisothiourea derivative was prepared by adding 4 g. of S-benzylisothiourea hydrochloride to 1.7 g. of the disodium salt formed by saponification of the hexa-

TABLE I.—ANALYTICAL DATA ON THE DILACTONE $C_8H_4O_4$

| Type of Analyses | Theory | Found |
|---|---|---|
| C; H (recryst. sample) | C, 58.5%; H, 2.5% | C, 58.21%; 58.04%; H, 2.62%, 2.66%. |
| Mol. Wt. (recryst. sample) | 164 | 163, 172. |
| C; H (sublimed sample) | C, 58.5%; H, 2.5% | C, 58.45%; H, 2.81%. |
| Mol. Wt. (sublimed sample) | 164 | 155, 162. |
| Neutral equiv. (by titration with sodium ethanolamine in ethylenediamine). | 164 | 160.71. |
| Sap. Equiv. (for 3 M) | 54.7 | 60.8, 59.6. |
| Hydrogenation (Pt/HOAc), g. $H_2$ per g. sample (for 5.0 M). | .0615 | .0517, .0516. |
| Hydrogenation (Pd/dioxane), g. $H_2$ per g. sample (for 3.0 M). | 0.0368 | .0412. |
| Ultraviolet absorption maximum λ max., in acetonitrile. | | 3,360 A. |

*Part B.*—Hydrogenation of the dilactone $C_8H_4O_4$ to suberic acid

A resublimed sample of the dilactone prepared as described above was hydrogenated in 170 ml. of acetic acid with platinum catalyst in a Parr bomb apparatus at room temperature. Between 4 and 5 mole equivalents of hydrogen were absorbed at 10-27 lb./sq.in. during 1 hour and 45 minutes. New catalyst was then added but absorption was very low and slow during the next hour and drodilactone with sodium hydroxide, i .e., the compound

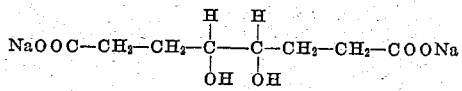

in water and concentrating the mixture by distillation at room temperature under 20 mm. pressure. The crystals which separated from the mother liquor were collected and recrystallized from a water/dioxane mixture. This product melted at 97-105° C.

Analysis of the S-benzylisothiourea derivative. Calc'd. for $C_{24}H_{34}O_6S_2N_4$: C, 53.60%; H, 6.30%; N, 10.40%. Found: C, 53.63%; H, 5.75%; N, 10.24%, 10.56%.

EXAMPLE III

*Preparation of the dilactone $C_8H_4O_4$ with acetylene in various recreation media*

Table II, below, summarizes a series of runs A, B, C and D, carried out as described in Example I, using the indicated conditions and the reaction media listed in place of acetonitrile.

TABLE II

| Run | A | B | C | D |
|---|---|---|---|---|
| g. of $C_2H_2$ | 26 | 26 | 26 | 26. |
| g. Cobalt Carbonyl | 3 | 2 | 1 | 1.5. |
| Reaction Medium (ml.) | Ethyl acetate (100). | n-Butyl acetate (100). | Xylene (206) | Methylpyrrolidone (125). |
| T° C | 90–100 | 95–103 | 102–113 | 90–112. |
| CO Pressure, Atmospheres | 650–920 | 790–990 | 700–855 | 750–950. |
| Time, Hours | 15.5 | 3.0 | 15.7 | 15.7. |
| Yield, gms | 19 | 31 | 20 | 50. |
| Yield, Percent | 12 | 19 | 12 | 31. |

EXAMPLE IV

*Preparation of the dilactone $C_{20}H_{12}O_4$ from phenylacetylene*

In accordance with the procedure described in Example I, a pressure reactor was charged with 100 ml. of acetone, 1.5 g. of cobalt carbonyl, and 80 g. of phenylacetylene. The charge was heated at 91°–110° C. for 15.5 hours under a carbon monoxide pressure of 770–965 atmospheres. The reaction mixture was filtered and the product on the filter separated and recrystallized twice from xylene. There was obtained 22 g. of a crystalline dilactone melting at 146–175° C. From the filtrate and mother liquor there was obtained an additional 3.5 g., making a total of 25.5 g. of the dilactone, $[\Delta^{2,2'(5H,5'H)}$-biphenylfuran)]5,5'-dione. The molecular weight value obtained for this dilactone was 325, as compared with the theoretical value of 316 for $C_{20}H_{12}O_4$. This dilactone showed a maximum absorption in the ultraviolet at 3820 A. and the specific absorptivity coefficient $$k_{3820 \text{ A.}} = 118.$$

*Analysis.*—Calc'd for $C_{20}H_{12}O_4$: C, 75.9; H, 3.8; mol. wt., 316. Found: C, 76.3; H, 3.9; mol. wt., 325.

EXAMPLE V

*Part A.—Preparation of the dilactone $C_{16}H_{20}O_4$ from n-butylacetylene*

The above example was repeated using 100 ml. of acetone, 2 g. of cobalt carbonyl, and 82 g. of n-butylacetylene instead of phenylacetylene. The reaction was conducted for 18 hours at 95°–120° C. and under a carbon monoxide pressure of 700–940 atmospheres. The crude reaction mixture was discharged and distilled. The product from the fraction distilling at 190°–205° C./2 mm. crystallized upon standing. A portion of this distillate was recrystallized from petroleum ether containing a small amount of ethyl acetate. After two recrystallizations the cream-colored dilactone, $[\Delta^{2,2'(5H,5'H)}$-bi(n-butylfuran)]-5,5'-dione, had a block melting point of 124° C.

*Analysis.*—Calc'd. for $C_{16}H_{20}O_4$: C, 69.50%; H, 7.30%; M. W., 276. Found: C, 69.20%; H, 7.36%; M. W. 270.

The ultraviolet absorption spectrum showed a strong peak at 3475 A. and a weak peak at 2600 A. The specific absorptivity, $k_{3475A.} = 144$.

*Part B.—Hydrogenation of the dilactone $C_{16}H_{20}O_4$ to a suberic acid*

Hydrogenation of this dilactone $C_{16}H_{20}O_4$ in acetic acid with platinum catalyst gave a hydrogen "number" of 0.0360 (0.0345) grams hydrogen per gram sample which corresponds closely to the absorption of 5 moles of hydrogen per mole of sample. The crude acid obtained was converted to the dianilide which melted at 136–140° C. Analysis gave the following values:

*Analysis.*—Calc'd. for $C_{28}H_{40}O_2N_2$: N, 6.40%. Found: N, 6.41%, 6.54%.

EXAMPLE VI

*Preparation of the dilactone $C_{16}H_{20}O_4$ from hexyne-3*

Following the procedure of Example I, using a charge consisting of 100 ml. of acetone, 2 g. of cobalt carbonyl, 40 g. of hexyne-3, and operating at 110°–134° C. under 800–910 atmospheres carbon monoxide pressure for 16 hours, there was obtained 4.2 g. of a dilactone, which, after recrystallization from an ethyl acetate/petroleum ether mixture, melting at 95°–96° C. The ultraviolet absorption spectra of the dilactone, $[\Delta^{2,2'(5H,5'H)}$-bi(diethylfuran)]-5,5'-dione, showed a maximum at 3440 A. and the specific absorptivity coefficient $k_{3440 \text{ A.}} = 139$.

*Analysis.*—Calc'd. for $C_{16}H_{20}O_4$: C, 69.60%; H, 7.30%; mol. wt., 276. Found: C, 69.50%; H, 7.40%; mol. wt., 265.

EXAMPLE VII

*Preparation of the dilactone $C_8H_4O_4$ from acetylene with cobalt acetylacetonate catalyst*

Following the procedure of Example I, a pressure reactor was charged with 100 ml. of acetone, 3 g. of cobalt acetylacetonate, and 26 g. of acetylene. The charge was heated to 140° C. under 850–1000 atmospheres of carbon monoxide pressure. These conditions were maintained for 14 hours. The reaction mixture was discharged from the reactor and filtered. The product on the filter was collected, dried, and then sublimed. There was obtained 7 g. of sublimate which by infrared corresponded to the dilactone of Example I. The infrared spectrum of this product was the same as that of Example I, except that there was a slight intensity change in the region of $5.98\mu$ where the shoulder disappeared and in the region of $10.75\mu$ where it increased from very weak to weak. There was also a shoulder in the region of $12.30\mu$. These minor changes in the infrared spectrum may be attributed to crystalline or isomeric changes or to traces of impurities, such as solvent.

EXAMPLE VIII

*Preparation of the dilactone $C_8H_4O_4$ showing effect of low ratio of acetylene/carbon monoxide on yield*

*Part A.*—Following the procedure of Example 1, the reactor was charged with 100 ml. of acetone, and 2 g. of cobalt carbonyl, followed by 26 g. of acetylene. The reaction was carried out at 97°–110° C. for 16 hours at a carbon monoxide pressure of 740–950 atmospheres. There was obtained, by sublimation, 32 g. of the dilactone product of Example I, and 16 g. of a non-sublimable residue. Based on the acetylene charged, this represents a 37% conversion.

*Part B.*—The above procedure was repeated using 1.5 g. of cobalt carbonyl, 100 ml. of acetone, 9 g. of acetylene, and carbon monoxide sufficient to raise the cold pressure to 400 atmospheres. The reaction was conducted at 107°–112° C. for 4.25 hours at a carbon monoxide pressure of 800–1000 atmospheres. The crude dried product weighed 27.3 g., of which 74% or 20.2 g. was the dilactone of Example I, and 13% was insoluble material. The conversion of the acetylene to dilactone corresponded to 71%.

Comparison of this result with that in the first part of this example shows that a low ratio of acetylene/carbon monoxide is more favorable to the formation of dilactone.

EXAMPLE IX

*Preparation of the dilactone $C_8H_4O_4$ from acetylene showing effect of low ratio of acetylene/carbon monoxide on yield at lower total pressures*

*Part A.*—Following the procedure described in Example I, a mixture of 100 ml. of acetone and 4 g. of cobalt carbonyl was charged into a pressure reactor. Thereafter 26 g. of acetylene was metered in by the procedure described in Example I. The reaction was carried out for 15.2 hours at 110°–113° C., while maintaining a carbon monoxide pressure of 250–300 atmospheres. The reaction mixture was filtered and the product on the filter collected and dried. Upon sublimation, there was obtained 7 g. of the dilactone which by infrared was found to correspond to the product of Examples I and II. The conversion to dilactone was 8.5% based on the acetylene charged into the reactor.

*Part B.*—Following the procedure described in Example I, the reactor was charged with 100 ml. of acetone and 1.5 g. of cobalt carbonyl, followed by addition of 7.5 g. of acetylene and carbon monoxide sufficient to raise the cold pressure to 100 atmospheres. The charge was heated at 90°–116° C. under a carbon monoxide pressure of 265–300 atmospheres for 16 hours. The crude product, after removal of acetone, weighed 15 g. and contained 44% of the dilactone of Examples I and II and 19% of insoluble by-product. This corresponds to a 28% conversion, based on the acetylene charged to the reactor.

Comparison of this yield with that of part A illustrates the advantage of using a low ratio of acetylene/carbon monoxide. That this practice is especially advantageous at lower total pressures is seen by comparison of this example with Example VIII.

EXAMPLE X

*Preparation of the dilactone $C_8H_4O_4$ showing effect of high ratio of solvent/acetylene on yield*

The above procedure of Example IX, part B, was repeated varying the solvent/acetylene ratio in runs (*b*) and (*c*) by increasing the volume of solvent charged while keeping the weight of acetylene constant, as shown in Table III. These results show that increasing the solvent/acetylene ratio is advantageous in improving the yield of desired dilactone.

TABLE III

| Run | (a) | (b) | (c) |
|---|---|---|---|
| ml. of Acetone | 100 | 200 | 300 |
| g. of Crude Product | 15.0 | 24.7 | 26.1 |
| Crude Product: | | | |
| Dilactone, Percent | 44 | 47 | 49 |
| Insoluble, Percent | 19 | 17 | 9 |
| Percent Conv. of Acetylene to Dilactone | 28 | 49 | 54 |

EXAMPLE XI

*Preparation of the dilactone $C_8H_4O_4$ from acetylene in cyclohexanone solvent*

A 400 ml. shaker tube was charged with 300 ml. of cyclohexanone and 1.5 g. of cobalt carbonyl, followed by addition of 7.5 g. of acetylene and carbon monoxide sufficient to raise the cold pressure to 400 atmospheres. The reaction was then carried out at 90–93° C. and 875–1000 atmospheres for 16 hours. The product was filtered and the solid was washed with ether and dried. It weighed 11.7 g. and was the pure dilactone, $k_{3400 A.}=204$.

The cyclohexanone filtrate was recharged to the tube, 7.5 g. of acetylene was added, and a second reaction was then run under the same conditions as the first. The product was filtered off and the filtrate was recharged to the tube as before, while the solid was washed with ether and dried. The conversions to dilactone in six successive runs made in this way were 49, 55, 63, 55, 52 and 50% of the theoretical, based on the acetylene. In each case the product collected by filtration was 100% dilactone. Samples that were analyzed showed no detectable cobalt content (hence less than 0.001% CO). By contrast, products filtered from reactions carried out in acetonitrile contain 5–10% of insoluble by-products and 1–2% of cobalt.

EXAMPLE XII

*Preparation of the dilactone $C_{28}H_{16}O_4$ from β-naphthylacetylene*

The procedure of Example I was repeated, employing 1 g. of cobalt carbonyl, 150 ml. of acetone, and 15 g. of β-naphthylacetylene, prepared as described in Ann. Chem. [10], 16, 421 (1931), and operating at 108–111° C. and 880–910 atmospheres carbon monoxide pressure for 15.5 hours. There was obtained 5 g. of a deep orange product, melting at 218–220° C. The product, [Δ2,2′(5H,5′H)-bi(β-naphthylfuran)] - 5,5′ - dione, had a specific ultraviolet absorbence coefficient, $k_{3930 A.}=78$.

*Analysis.*—Calc'd. for $C_{28}H_{16}O_4$: C, 80.90%; H, 3.90%; mol. wt., 416. Found: C, 81.07%; H, 4.16%; mol. wt. 445.

The infrared spectrum showed strong absorption at 5.65μ for lactone carbonyl, and 6.15μ, 6.25μ, 6.35μ, and 6.4μ for conjugated >C=C< unsaturation.

In addition, there was obtained 9 g. of crude dilactone.

EXAMPLE XIII

*Preparation of the dilactone $C_{20}H_{10}O_4Cl_2$ from p-chlorophenylacetylene*

The procedure of Example I was repeated with a charge consisting of 1 g. of cobalt carbonyl, 125 ml. of acetone, and 15 g. of p-chlorophenylacetylene, and operating at 97–102° C. and 910–950 atmospheres of carbon monoxide pressure for 16.5 hours. There was obtained 12 g. of a product melting at 243–258° C. and showing the characteristic infrared lactone spectrum.

*Analysis.*—Calc'd. for $C_{20}H_{10}O_4Cl_2$: C, 62.3%; H, 2.6%; Cl, 18.4%; M. W., 385. Found: C, 63.9%; H, 3.2%; Cl, 16.9%; M. W., 380.

The ultraviolet spectrum showed specific absorbence $k_{3990 A.}=98$. The product, [Δ2,2′(5H,5′H) - bi(p - chlorophenylfuran)]-5,5′-dione, showed infrared absorption at 5.65μ for lactone carbonyl, 6.25μ, 6.10μ, 6.73μ for >C=C< unsaturation, and 9.15μ and 9.89μ for p-chlorophenyl.

EXAMPLE XIV

*Preparation of the dilactone $C_{22}H_{16}O_6$ from o-methoxyphenylacetylene*

The procedure of Example I was repeated with a charge consisting of 1 g. of cobalt carbonyl, 100 ml. of acetone, and 12 g. of o-methoxyphenylacetylene and operating at 100° C. and 900–990 atmospheres of carbon monoxide pressure for 16.2 hours. There was obtained 18 g. of a product melting at 186–220° C. and whose infrared spectrum showed the presence of a lactone ring, o-substituted aromatic ring, and the methoxyl group. The product [Δ2,2′(5H,5′H) - bi(o - methoxyphenylfuran)]-5,5′-dione, showed specific absorbence, $k_{4300 A.}=82$.

*Analysis.*—Calc'd. for $C_{22}H_{16}O_6$: C, 70.3; H, 4.3; M. W., 276. Found: C, 70.1; H, 4.3; M. W., 391.

The compound showed strong absorption in the infrared at 5.7μ for lactone carbonyl, at 6.05μ, 6.25μ, 6.45μ, and 6.7μ for $>C=C<$ unsaturation, 8.0μ for ether —C—O—C—, and 13.25μ for o-substituted aromatic ring.

Methods for producing the higher melting isomer, the cis isomer of [$\Delta^{2,2'(5H,5'H)}$-bifuran]-5,5'-dione are illustrated in the following examples.

EXAMPLE XV

One gram of the dilactone of Example I was heated with 15 ml. of 85% phosphoric acid on the steam bath for several hours. The cooled solution was filtered to give 0.6 g. of a solid product, the cis isomer of [$\Delta^{2,2'(5H,5'H)}$-bifuran]-5,5'-dione, which was recrystallized from methyl ether ketone, M. P. 248° C.; $k_{3340 A.}=224$.

EXAMPLE XVI

A solution of the dilactone of Example I (4.4 g.) in pyridine (125 ml.) was refluxed for five hours. The solution became black, the precipitate which formed was separated by filtration, and the filtrate concentrated. There was thus obtained 1.0 g. of the cis isomer of [$\Delta^{2,2'(5H,5'H)}$-bifuran]-5,5'-dione, which was recrystallized twice from methyl ethyl ketone, M. P. 243–245° C.; $k_{3340 A.}=224$.

EXAMPLE XVII

A 19 g. sample of the dilactone of Example I was heated with 85% phosphoric acid (300 ml.) on the steam bath for several hours. The undissolved material (5.8 g.) was collected by filtration. The cooled filtrate yielded 4.8 g. of crystals. Each of these solids was recrystallized repeatedly from methyl ethyl ketone. Various crystallization fractions melted from 246–248° C. and were each shown by composition and ultraviolet and infrared absorption analysis to be the isomer (total conversion 56%). The purest fraction had a M. P. of 248° C.; $k_{3340 A.}=221$. This compound showed a strong absorption band at 6.0μ and a doublet at 6.5μ and had a lactone carbonyl band at 5.63μ. Analysis: Found, C, 58.71%, 58.87%; H, 2.60%, 2.66%. On the basis of the infrared analysis this is characterized as the cis isomer of [$\Delta^{2,2'(5H,5'H)}$-bifuran]-5,5'-dione.

The remainder of the phosphoric acid solution was poured into ethanol to precipitate 4.3 g. of a mixture of the two isomers of the unsaturated dilactone, which was recrystallized from methyl ethyl ketone and then characterized by melting point, composition, and spectra, M. P. 223–224° C.; $k_{3360 A.}=205$.

EXAMPLE XVIII

The action of a three-fold excess of p-nitroaniline (10.8 g., 0.078 mole) and boiling acetic acid (350 ml.) on the dilactone of Example I (4.1 g., 0.025 mole) for 8 hours resulted in crystals melting at 245° C., after recrystalliztaion from acetic acid.

*Analysis.*—Calcd. for $C_8H_4O_4$: C, 58.55; H, 2.46. Found: C, 58.62; H, 2.60.

The sample had $k_{3340 A.}=220$ and after an additional recrystallization from methyl ethyl ketone, it had $k_{3340 A.}=223$, and M. P. 245–247° C. The cis isomer product showed the same infrared absorption spectrum as the product of Example XVII.

EXAMPLE XIX

When a solution of 2.3 g. of the dilactone of Example I in 5 ml. of concentrated sulfuric acid was allowed to stand at room temperature for several weeks, colorless crystals came out of solution. These were recrystallized several times from methyl ethyl ketone and shown by melting point, infrared and ultraviolet absorption analyses to be identical to the cis isomer product of Example XVII. The purest fraction had a M. P. of 247–248° C.; $k_{3340 A.}=221$; C, 58.65%, 58.66%; H, 2.68%, 2.60%.

This cis isomer compound shows the same infrared absorption spectrum as the product of Example XVII.

EXAMPLE XX

A 210 g. sample of the dilactone of Example I and 500 ml. of concentrated sulfuric acid were heated on the steam bath for 4 hours. The cooled solution was poured into a mixture of 500 g. of ice and 2 liters of water cooled externally by an ice bath. The precipitate was collected by filtration on a sintered glass filter and recrystallized from cyclohexanone to give 176 g. (84%) of a product which by the ultraviolet absorption analysis corresponded to the compound of Example XVII. After recrystallization from methyl ethyl ketone the cis isomer product had a $k_{3350 A.}=207$.

EXAMPLE XXI

A 10 g. sample of the crude dilactone of Example I was added to 35 ml. of sulfuric acid in 35 ml. of water. The mixture was heated for 30 hours on the steam bath. The solid material weighed 6.3 g. and was shown by ultraviolet absorption analysis to be identical to the cis isomer product of Example XVI; $k_{3340 A.}=220$, after recrystallization from methyl ethyl ketone.

EXAMPLE XXII

To a mixture of 10 g. of the crude dilactone of Example I and 15 ml. of water was added 45 ml. of concentrated sulfuric acid. Much heat was evolved and a homogenous solution resulted. After several hours of gentle warming on the steam bath the solution was allowed to cool, giving crystals of the cis isomer (2.7 g.). The filtrate was poured into ice water to precipitate another 2.6 g. of a product which by ultraviolet absorption analysis was identical to the cis isomer product of Example XVI. The main fraction when recrystallized from methyl ethyl ketone had $k_{3340 A.}=223$.

EXAMPLE XXIII

The crude dilactone of Example I was recrystallized twice from dimethylformamide. This recrystallized product melted at 230–245° C. and had a $k_{3340 A.}=213$, which corresponds to the values for the high-melting cis form of [$\Delta^{2,2'(5H,5'H)}$-bifuran]-5,5'-dione.

When the crude product of Example I was recrystallized from acetone it melted at 222–224° C. which low melting point corresponds to that of the trans form of [$\Delta^{2,2'(5H,5'H)}$-bifuran]-5,5'-dione.

EXAMPLE XXIV

*Preparation of the cis isomer of the dilactone $C_8H_4O_4$ from acetylene in the presence of hydrogen sulfide*

A stainless steel-lined pressure reactor was charged with 1.5 g. of cobalt carbonyl and 80 g. of acetone. The reactor was then closed, chilled, and evacuated. It was further charged with 20 g. of hydrogen sulfide and 26 g. of acetylene. After heating at 98–112° C. under carbon monoxide pressure of 780–960 atmospheres for 17 hours the reactor was opened and the product discharged. It was a dark liquid with a small amount of black powdered solid. The entire product was transferred to a Soxhlet extractor and extracted with acetone for 24 hours. The extract contained no solid material but upon concentration, 0.3 g. of solid crystallized. This solid consisted of thin rectangular platelets rather than needles. Upon recrystallization from ethyl acetate this cis isomer product melted at 245° C., about 10 degrees higher than the trans form of [$\Delta^{2,2'(5H,5'H)}$-bifuran]-5,5'-dione. Further concentration of the filtrate gave 0.2 g. more of the crystalline solid cis isomer. This product contained 58.17% C and 2.75% H, as compared with calculated values of 58.5% C and 2.44% H for $C_8H_4O_4$.

EXAMPLE XXV

*Part A.—Preparation of the cis isomer of the dilactone $C_8H_4O_4$ from acetylene in presence of hydrogen sulfide*

Example XXIV was repeated, except that the reaction temperature was 100–104° C., the carbon monoxide pressure 825–1,000 atmospheres and the time 16.5 hours. The crystalline solid which formed was recovered as described in Example XXIV. The product melted at 241–243° C. The ultraviolet absorption of this solid had a maximum at 3340 A., corresponding to the cis form of $[\Delta^{2,2(5H,5'H)}$-bifuran]-5,5'-dione and differing from the dilactone of Example I, which has a maximum at about 3400 A. About 4.7 g. of this solid was isolated. The product showed a strong absorption at $5.65\mu$ and at $6.2\mu$ and $6.25\mu$.

The above cis form of the dilactone can be converted to the hexahydro derivative by hydrogenation as described below:

*Part B.—Preparation of the saturated dilactone, $C_8H_{10}O_4$, from the cis isomer of the dilactone $C_8H_4O_4$*

A slurry of 11.0 g. of the above cis form of the dilactone in 350 ml. of acetic acid was shaken with 1.5 g. of a 10% palladium-on-charcoal catalyst and hydrogen (re-pressured to 44 lb./sq. in.) at room temperature. The hydrogenation was completed in 40 minutes. The filtered solution was concentrated under reduced pressure until white crystals appeared. The first two crops weighed 5.2 g., M. P. 104–106° C., after recrystallization from chloroform-petroleum ether. Both the crystalline and non-crystallized portions were shown by infrared data to be identical with those obtained from hydrogenation of the ordinary trans isomer of $[\Delta^{2,2'(5H,5'H)}$-bifuran]-5,5'-dione.

In the formation of the dilactones of this invention, there are actually involved 2 moles of an acetylene and 4 moles of carbon monoxide. In practice, this ratio is attained by charging a weighed sample of the acetylene into the reactor and then injecting carbon monoxide in amount sufficient to provide 2 moles thereof per mole of acetylene. Employing a 400 ml. reactor and 25–30 g. of acetylene, the amount of carbon monoxide injected is that which will provide a total pressure in the range of 50–3000 atmospheres at reaction temperature.

The reaction is conducted until there is no further pressure drop and this generally requires from 1–20 hours, although shorter or longer reaction times can be employed. Througout the reaction period the pressure within the reactor is maintained by periodic injections of carbon monoxide.

The acetylenes used in preparing the dilactones of this invention correspond to R—C≡C—R', wherein R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals which are free from non-aromatic unsaturation, especially of not more than 12 carbon atoms, e. g., alkyl, especially short chain alkyl, i. e., containing less than seven carbon atoms, aryl, especially where the aryl radical is hydrocarbon of not more than 10 carbon atoms, aralkyl, especially of not more than seven carbons, or cycloalkyl, particularly of not more than seven carbon atoms. Examples of such radicals are methyl, ethyl, octyl, decyl, dodecyl, phenyl, tolyl, xlyl, naphthyl, benzyl, cyclohexyl, methylcyclohexyl, chlorophenyl, chloronaphthyl, methoxyphenyl, ethoxyphenyl, decyloxyphenyl, dodecyloxyphenyl, dodecyloxynaphthyl, and the like. Examples of such acetylenes are acetylene, methylacetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, etc.

The reaction between the acetylene and carbon monoxide is carried out batchwise or continuously in the presence of an inert organic liquid medium. By "inert organic liquid medium," as used herein, is meant organic liquids which contain no active hydrogen, as defined by S. Siggia, "Quantitative Organic Analysis Via Functional Groups," 2nd ed. (1954), page 78, and determined by the Zerewitinoff method [Ber. 40, 2026 (1907); J. Am. Chem. Soc. 49, 3181 (1927)]. Thus, the acetylene is the only compound in the reaction system which may contain active hydrogen. Specific inert organic liquids are isooctane, toluene, acetonitrile, acetone, ethyl acetate, dioxane, diethyl ether, xylene, benzene, etc. The nitriles and ketones are in general preferred over the hydrocarbons and ethers.

The amount of solvent used can be varied over wide limits but generally it is at least equal to the weight of the acetylene charged into the reactor. An amount in excess of ten times the weight of the acetylene is commonly advantageous from the standpoint of yield, and even twenty or more times is sometimes preferred.

The catalysts used are the cobalt carbonyls and the compounds formed by reaction of cobalt carbonyl with electron donor solvents such as ketones and nitriles that fall within the definition of inert organic media given above. Cobalt acetylacetonate can be used as an equivalent for cobalt carbonyl as shown in Example VII.

Cobalt carbonyl can be made by direct reaction of carbon monoxide with the metal in reactive form, as described in J. Am. Chem. Soc. 70, 383–6 (1948).

The amount of catalyst employed is generally from 0.01 to 15%, based on the acetylene charged into the reactor.

The dilactones of this invention are useful as inhibitors for light catalyzed polymerizations, as shown below:

One percent by weight of the dilactone of Example I was added to freshly distilled monomeric methyl methacrylate under nitrogen and the mixture sealed in a tube. The mixture was then irradiated with two black light fluorescent lamps (General Electric) at a distance of 3.5 inches for 7.5 hours. At the end of this time there was no noticeable increase in the viscosity of the methyl methacrylate, indicating that no polymerization had occurred.

Monomeric methyl methacrylate, without added dilactone, irradiated under the same conditions and for the same length of time, was converted to a very thick syrup.

The dilactone of Example IV exhausts readily into "Dacron" polyester fiber, acetate, and "Orlon" acrylic fiber, giving yellow to orange dyeings of good stability to laundering. This is illustrated below:

Three solutions of 0.015 g. of the dilactone of Example IV in 5 ml. of methyl Cellosolve were prepared. Each solution was then diluted with 40 ml. of boiling water containing 0.2 ml. of acetic acid. Skeins of "Dacron" polyester fiber, "Orlon" acrylic fiber, and cellulose acetate were immersed in each solution and permitted to simmer for one hour. In all three cases good dyeings of the fibers with exhaustion of the dye bath occurred. After dyeing the fibers were rinsed in running water for 5 minutes, then boiled in 1% soap solutions for 5 minutes, followed by soaking in running water for 30 minutes. In all cases permanent dyeings were obtained.

The dilactones of this invention can be hydrogenated in acetic acid with a platinum catalyst to obtain suberic acids, which are useful for the preparation of fiber-forming polyesters. In addition to acetic acid, other organic solvents can be used, such as dioxane, ethyl acetate, tetrahydrofuran and dimethylformamide.

The unsaturated dilactones of this invention can be hydrogenated in solution in an organic solvent with a palladium catalyst to the corresponding hexahydrodilactones of the formula $C_8(RR')_2H_6O_4$ which can be represented by the general structural formula

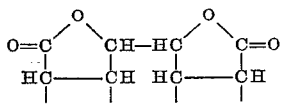

wherein one free valence of each ring is satisfied by R and the other free valences of said rings are satisfied by R', said R and R' being defined as aforesaid with respect to the unsaturated dilactones. In a preferred method for effecting the hydrogenation, the reaction is effected with 10% palladium-on-carbon at room temperature (ca 20° C.) and 45 lb./sq. in. pressure using dioxane or acetic acid as the reaction medium. The hexahydrodilactones can be used as modifiers for polymeric resins such as a plasticizer for vinyl chloride resins.

The products of this invention are useful as fungicides. This is illustrated by the results of greenhouse tests with tomato plants as described by McCallan and Wellman (Crop Protection Digest, bulletin 68, July 1943, pages 93–134). In such as test one set of tomato plants is sprayed with a 0.0016% aqueous solution of the dilactone of Examples I and II and another set with a 0.2% aqueous solution of the same dilactone. The treated plants, along with a corresponding group of untreated controls, are inocclulated with tomato early blight *Alternaria solani*). When the control plants showed 100% disease, the plants treated with the 0.2% solution of dilactone showed 2% disease and those with the 0.0016% dilactone solution 24% disease.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A dilactone having the structural formula

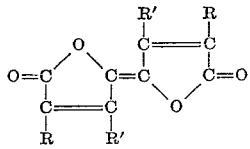

wherein R and R' are selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, said dilactone giving a suberic acid on hydrogenation with a platinum catalyst in acetic acid.

2. A dilactone having the structural formula

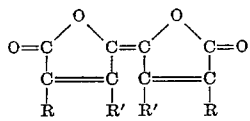

wherein R and R' are selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, said dilactone giving a suberic acid on hydrogenation with a platinum catalyst in acetic acid.

3. $[\Delta^{2,2'(5H,5'H)}$-bifuran]-5,5'-dione.

4. The trans form of $[\Delta^{2,2'(5H,5'H)}$-bifuran]-5,5'-dione having the structural formula

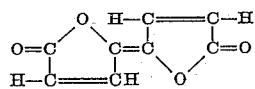

5. The cis form of $[\Delta^{2,2'(5H,5'H)}$-bifuran]-5,5'-dione having the structural formula

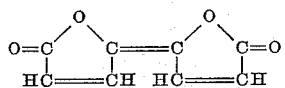

6. Process for preparing a dilactone which comprises reacting an acetylenic compound in an inert organic liquid reaction medium free from active hydrogen, with carbon monoxide under a pressure of at least 50 atmospheres, at a temperature within the range of 60 to 175° C., and in contact with a cobalt carbonyl catalyst, said acetylenic compound corresponding to the formula R—C≡C—R' wherein R and R' are selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, and obtaining as the resulting product a dilactone as defined in claim 11.

7. Process for preparing a dilactone as set forth in claim 6 wherein the carbon monoxide is present in said reaction medium in proportion of at least two moles per mole of acetylenic compound.

8. Process for preparing a dilactone which comprises reacting acetylene, in an inert organic liquid reaction medium free from active hydrogen, with carbon monoxide under a pressure of at least 50 atmospheres, at a temperature within the range of 60° to 175° C., and in contact with a cobalt carbonyl catalyst, and obtaining as the resulting product $[\Delta^{2,2'(5H,5'H)}$-bifuran]-5,5'-dione.

9. Process for preparing a hexahydrodilactone which comprises hydrogenating a dilactone of claim 11 in contact with a palladium catalyst, and obtaining as the resulting product a hexahydrodilactone of the formula $C_8(RR')_2H_6O_4$ wherein R and R' are defined as in said claim 11.

10. Process for preparing a hexahydrodilactone which comprises hydrogenating $[\Delta^{2,2'(5H,5'H)}$-bifuran]-5,5'-dione in contact with a palladium catalyst, and obtaining as the resulting product the hexahydrodilactone of $[\Delta^{2,2'(5H,5'H)}$-bifuran]-5,5'-dione.

11. A dilactone having one of the structural formulas

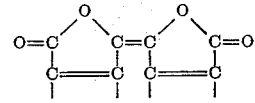

and

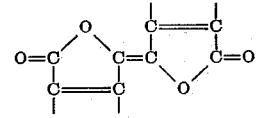

wherein one free valence of each ring is satisfied by R and the other free valence of each ring is satisfied by R', said R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, said dilactone giving a suberic acid on hydrogenation with a platinum catalyst in acetic acid.

(References on following page)

References Cited in the file of this patent

UNITED STATES PATENTS

| | | |
|---|---|---|
| 2,292,950 | Loder et al. | Aug. 11, 1942 |
| 2,302,321 | Hopff | Nov. 17, 1942 |
| 2,640,837 | Fang | June 2, 1953 |
| 2,662,908 | Logan | Dec. 15, 1953 |
| 2,688,621 | Urban | Sept. 7, 1954 |

OTHER REFERENCES

Klingsberg: Chem. Rev. 54, 59–77 (1954).
Fang et al.: J. Org. Chem. 16, 1231–7 (1951).
Chem. Abst. 46, page 1794d (1952).